United States Patent
Bulusu et al.

(10) Patent No.: US 8,161,376 B2
(45) Date of Patent: Apr. 17, 2012

(54) CONVERTING A HETEROGENEOUS DOCUMENT

(75) Inventors: Gopi Kumar Bulusu, Chennai (IN); Murali Desikan, Chennai (IN)

(73) Assignee: Sankhya Technologies Private Limited, Tamil Nadu (IN)

( * ) Notice: Subject to any disclaimer, the term of this patent is extended or adjusted under 35 U.S.C. 154(b) by 994 days.

(21) Appl. No.: 10/587,243

(22) PCT Filed: Jan. 28, 2004

(86) PCT No.: PCT/IN2004/000020
§ 371 (c)(1), (2), (4) Date: Aug. 20, 2008

(87) PCT Pub. No.: WO2005/073867
PCT Pub. Date: Aug. 11, 2005

(65) Prior Publication Data
US 2009/0199089 A1    Aug. 6, 2009

(51) Int. Cl.
G06F 17/00    (2006.01)
G06F 17/30    (2006.01)

(52) U.S. Cl. ........ 715/239; 715/234; 715/236; 707/755; 707/756

(58) Field of Classification Search .............. 715/241
See application file for complete search history.

(56) References Cited

U.S. PATENT DOCUMENTS

| | | | |
|---|---|---|---|
| 5,918,013 A | 6/1999 | Mighdoll et al. | |
| 6,029,182 A | 2/2000 | Nehab et al. | |
| 6,125,391 A | 9/2000 | Meltzer et al. | |
| 6,915,304 B2 * | 7/2005 | Krupa | 707/756 |
| 2002/0073119 A1 * | 6/2002 | Richard | 707/513 |
| 2004/0060003 A1 * | 3/2004 | Mani et al. | 715/513 |

* cited by examiner

*Primary Examiner* — Kyle Stork
*Assistant Examiner* — Keith Bloomquist
(74) *Attorney, Agent, or Firm* — Rader, Fishman & Grauer PLLC

(57) ABSTRACT

A method for transforming a heterogeneous compound document to a desired format based on a prescribed model is provided. The method comprises the steps of: (i) specifying the components of the heterogeneous compound document as a hierarchical tree structure in multiple formats and specifying the input sources of information for each of the components as part of the model; verifying and composing the heterogeneous compound document using a modeling language parser and a document composer by dynamically obtaining input information from the sources specified in the model and (iii) converting the input compound document to the desired format using the document composer. A system for performing the abovementioned method is also provided.

2 Claims, 4 Drawing Sheets

CONVERTING A HETEROGENEOUS DOCUMENT

FIELD OF INVENTION

The invention relates to a method for transforming a heterogeneous compound document to a desired format based on a prescribed model. The invention also provides a system for specifying, verifying, dynamically composing and transforming a heterogeneous compound document into a required format based on a prescribed model.

A compound document is composed from different types of information obtained from different sources and presented as a single unit. The information could be text, images, video and other data generated by applications.

A computer programming language is a language with well-defined set of syntax and semantics, which can be used to describe a set of instructions that perform a specific computation. Programming languages are used for developing programs that can be executed by a computer.

A stream is a programming entity that allows data to be read from a source and/or written to a destination in a sequence. The source and destination for a stream could be a file, a database, memory area etc. A stream can be an input stream which allows data to be read only, an output stream which allows data to be written only or an input-output stream which allows data to be read as well as written.

A stack is a data structure in which elements can be stored and retrieved in such a way that the last element that was placed will be the first element that can be retrieved. The operation of placing an element in a stack is called as 'push' and the operation of retrieving the top-most element from the stack is known as 'pop'. The element that is popped from the stack is removed from the stack.

A compound document is composed from different types of data with different formats obtained from different sources. For example, a compound document could contain text obtained from one source, images obtained from another, tables obtained from yet another source and so on. The compound document could be composed statically, wherein all data is collected beforehand and aggregated to form the document, or it could be composed dynamically with the content obtained in real time. It is necessary to define the structure, layout and source of information to create such compound documents.

The invention provides a method and a system for dynamic model-driven specification, verification, composition, and transformation of compound documents. A single uniform model is used to specify the components of the document, to verify the components, to compose the compound document from the components dynamically and to transform the document to required formats.

BACKGROUND OF THE INVENTION

Creation of a compound document is known using a word processor program. Modern word processor programs allow importing contents from different types of sources like text files, image files, web pages etc to create a compound document. It is also possible to reflect the changes in the imported document when the original document is changed. This method of creating compound documents is manual and involves only plain inclusion of the corresponding sub documents to create the compound document. There is no way to dynamically compose documents, verify the contents and transform the documents to different formats.

The Hyper Text Markup Language (HTML), a language used to create web pages, provides a construct to specify links to other sources of information in a document. The HTML hyperlink element provides the location of a file or other resource and can be used to refer to other documents from a HTML document. A uniform resource locator (URL), in the hyperlink element specifies the resource type and additional information about the resource being accessed. The resource type specifies a particular resource such as file, hypertext page, news server, file server etc. Each resource type is associated with a specific server type. The web server processes a URL, accesses the resources specified in it and provides the required information to the client. This method allows specification of multiple sources of information for creating a web page. However, this source information is specified as a link only and the user has to select the link to view information from different sources. Also, there is no way to verify if the different contents are in correct format and to transform the documents to different format.

There exist compound document models and frameworks like Document Object Model of World Wide Web consortium, and Object Linking and Embedding (Microsoft). These frameworks allow composition and manipulation of compound documents from different data sources and applications. However, these frameworks do not provide a single consistent model that allows for specifying the components of the document, verifying if the contents are in correct format and for transforming the compound document to required formats.

DESCRIPTION OF THE INVENTION

The present invention describes a method for transforming a heterogeneous compound document to a desired format based on a prescribed model comprising the steps of:
  (i) specifying components of the heterogeneous compound document as a hierarchical tree structure describing its elements;
  (ii) verifying and composing the heterogeneous compound document using a modeling language parser and a document composer; and
  (iii) converting the heterogeneous compound to the desired format specified in the prescribed model.

The step of specifying components of heterogeneous compound document as a hierarchical tree structure is carried out by the following steps.
  (i) Identifying a hierarchical structure of the compound document and determining the root nodes, internal nodes and leaf nodes.
  (ii) Creating a leaf element in the model description of the document for each leaf node and describing the leaf node in each of the required formats, with the proviso that for each value in the node, a stream start symbol, a stream descriptor, the value and stream end symbol are added to list of values corresponding to the given format in the leaf element, if input is obtained from a new source of data and otherwise the value specified by the leaf node is added to the list of values corresponding to the format in the leaf element.
  (iii) Creating an internal node element in the model of the document for each identified internal node and describing the internal node in each of the required formats for each child node of the internal node with the proviso that (a) if the input for the child node is to be obtained from a new source of data, a stream start symbol (a unique string which indicates the start of a stream specification) and a stream descriptor (a string which provides information about the stream) are added to the list of values corresponding to the given format in the internal node element; (b) if the child node is a leaf node, corresponding leaf element is added to the list of values corresponding to the given format and a stream end symbol (a unique string which indicates the end of the stream specification) is also added if a stream start symbol was added in step (a), and (c) if the child node is another internal node, a reference to the corresponding internal node element is added to the list of values corresponding to the given format and a stream end symbol is also added, provided a stream start symbol was added in step (a).

(iv) Creating a root element in the model of the document for each identified root node and describing a root node in each of the required formats for each child node of the root node with the proviso that (a) if the input for the child node is to be obtained from a new source of data, a stream start symbol and a stream descriptor are added to the list of values corresponding to the given format in the root element, b) if the child node is a leaf node, a reference to the corresponding leaf element is added to the list of values corresponding to the given format in the root element and a stream end symbol is also added, if a stream start symbol was added in step (a), and (c) if the child node is an internal node, a reference to the corresponding internal node element of the model is added to the list of values corresponding to the given format of the root element and a stream end symbol is also added if a stream start symbol was added in step (a).

The step of verifying and composing the heterogeneous compound document is carried out by the following steps.

(i) Provide a model of the compound document using the modeling language and the document format identifier as inputs.

(ii) Parse the input model using a modeling language parser and update the model database with parsed model information.

(iii) Obtain a default input stream for the implementation of the method and push the same into a stream stack.

(iv) Consider each root element in the parsed model information and obtain a value list corresponding to the input document format specified by the input document format identifier.

(v) Perform the following steps on the value list obtained in the previous steps:
  a) repeat step (iv) with next value for a constant value which matches with the input value;
  b) obtain a value list corresponding to the internal node element or leaf element from model database and recursively repeat step (iv) with a new list for a value which is a reference to an internal node element or a leaf element;
  c) obtain the next value which will be the stream descriptor for a value which is a stream start symbol and provide the stream descriptor to the stream module to obtain a new stream and push it into the stream stack;
  d) pop the top most stream from the stream stack and use the current top most stream for further processing for a value which is a stream end symbol;

(vi) pop all the streams from the stream stack except for the default input stream, reset the default input stream and repeat step (iv) onwards with the next root element in the model, till all values in the value list match with the input and the root element will contain the compound document information.

The step of transforming the heterogeneous compound document to the desired format specified in the prescribed model is carried out by the following steps.

(i) Provide a model of the compound document and the root element of the model matching with the input and the output document format identifier as inputs.

(ii) Obtain a value list corresponding to the output document format identifier from the root element.

(iii) Consider each value from the value list obtained and
  (a) output the value if the value obtained is a constant;
  (b) obtain the value list corresponding to the output document format identifier from the internal element or leaf element, if the value is a reference to an internal node element or leaf element and recursively repeat step (iii) for the new value list.

The present invention also provides a system for specifying, verifying, dynamically composing and transforming a heterogeneous compound document based on a prescribed model, comprising a modeling language for depicting the structure of a compound document in one or more formats as a hierarchical tree structure and specifying the information source for each component of the document, providing a root element describing root nodes which are at the top of the structure, an internal node element representing the internal nodes of the compound document and a leaf element representing the leaf nodes at the bottom of the tree structure; a modeling language parser for parsing the models created using the modeling language, analysing the given model, checking whether it confirms with the document model syntax and creating an internal representation of the model elements; a model database which stores information about each element defined in the model; a stream module for obtaining data from different sources specified in the stream specification in a model for composing compound document; and a document composer for composing the document in the format specified by the model using information from the model database and from multiple sources using the stream module and transforming the composed document to convert it into a format specified in the document model.

DESCRIPTION OF THE INVENTION WITH REFERENCE TO THE ACCOMPANYING DRAWINGS

Figure 1:
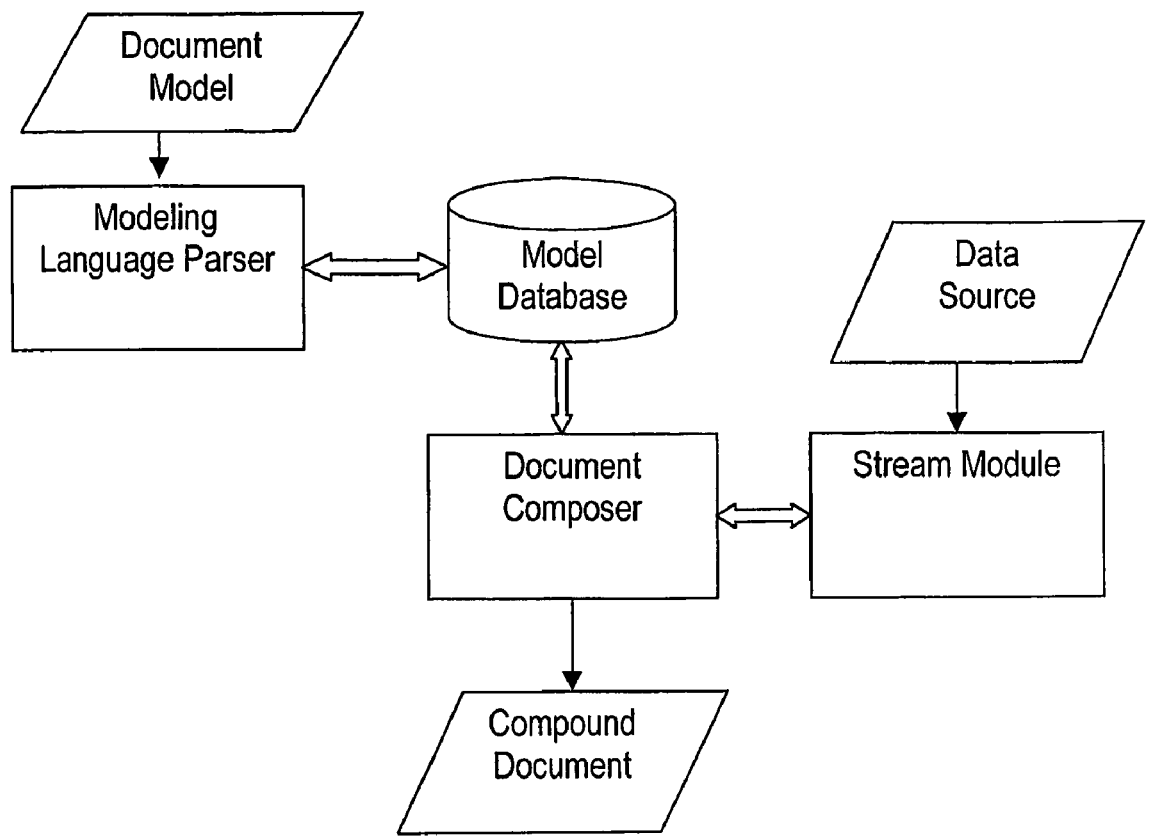
FIG. 1 shows a block diagram of the system for specifying, verifying and transforming a compound document to desired format.

The system according to the present invention is shown in FIG. 1 and it comprises a document model specified using the modeling language, a modeling language parser, a model database and a document composer. A stream module is provided to the document composer for obtaining information from different data source for each component of the compound document. The document model depicts the hierarchical tree structure of a compound document. In this representation the document is treated as a collection of nodes that form a tree structure. The node at the top of the tree is called the root node. The nodes that are at the bottom of the tree are called leaf nodes and the other nodes are called internal nodes. The modeling language provides the following elements.

a) A root element, which can be used to describe the root nodes of the hierarchy.

b) An internal node element, which can be used to describe the internal nodes of the document's tree structure.

c) A leaf element, which can be used to describe the leaf nodes of the hierarchy.

Each of these elements can describe the corresponding document node in one or more formats. Corresponding to each format, a list of values can be specified in a root, internal node or leaf element. The list of values contains constant values or references to other internal node or leaf elements. The model of a document can contain multiple root elements, node elements and leaf elements. The root elements can contain references to already defined internal node and leaf elements, and the internal node elements can refer to already defined internal node and leaf elements.

The modeling language further provides various types for representing data. These comprise integer, character, string, real etc. These can be used to represent leaf nodes of the document. The modeling language provides a stream construct to specify the sources of data required to compose a compound document. The stream construct consists of stream start symbol which is a unique string indicating start of a stream specification, a stream descriptor and a stream end symbol which is a unique string indicating the end of a stream specification. The stream descriptor specifies the stream identifier, which is a unique string that specifies a stream of a particular type such as a file stream, a database stream and other stream-specific information. This stream specification is part of the value list of the model element that describes a document node. Thus, the stream information is embedded as part of the model. This allows for dynamic composition of compound document from multiple sources.

The system also comprises a modeling language parser for parsing the models created using the modeling language. The parser analyses the given model and checks if it is according to the modeling language syntax. The parser also creates an internal representation of the model elements in the model database in a form suitable for processing.

The system further comprises a model database, which stores the information about the parsed models. The database allows information about the hierarchical model to be accessed and searched. The model database contains information about each element defined in the model. For each element, there can be a number of different formats as defined in the model. For each of these formats, the list of values specified in the model is stored. Each value in this list could either be a constant value or a reference to a model element. The model database provides operations using which it will be possible to obtain a list of values for an element for a given format. A particular format is identified by a format identifier, which is a unique string.

A stream module is provided which is responsible for obtaining data from different sources as specified in the stream specification in a model for composing compound documents. The stream module contains information about each supported stream and stream specific implementation. New streams can be created and dynamically registered with the stream module. During, compound document verification and composition, if information is required from a new data source, the stream descriptor from the model is provided to the stream module to obtain the corresponding stream from which the required data is obtained.

A document composer is provided in the system, which uses the model information from the model database to obtain input information from multiple sources by using the stream module, verify that they are according to syntax specified in the model and to compose the compound document that is described in the model. This module also performs transformations on a composed document to convert it into a different format specified in the model of the document. The document composer comprises a stream stack, which is a structure for storing stream information. Streams can be pushed into the stack and the top-most stream can be popped from the stack. This stack is used to process multiple sources of data during verification and composition of compound documents.

Figure 2:
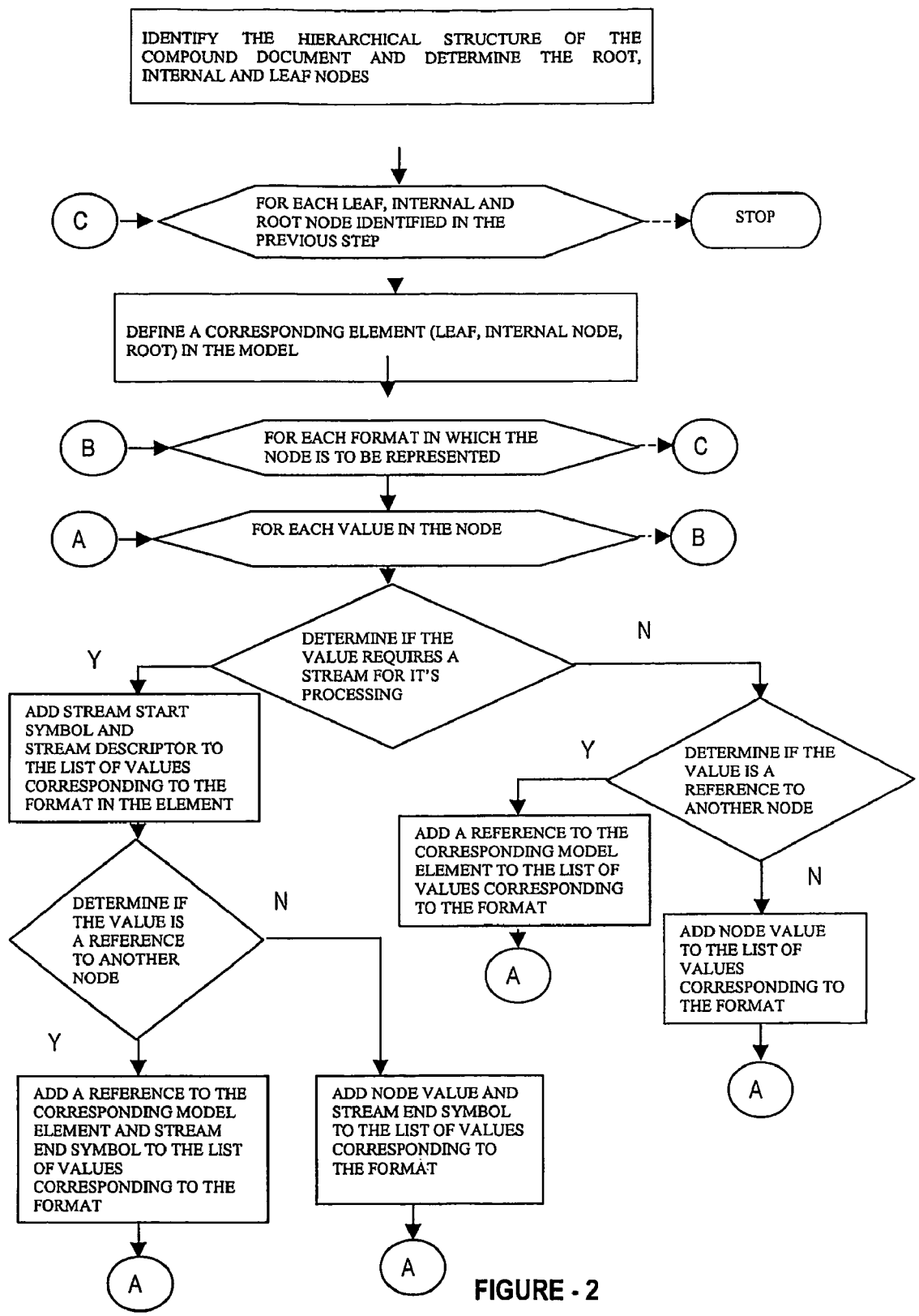
FIG. 2 shows the method for specifying compound documents based on a prescribed model.

FIG. 2 shows the flowchart corresponding to a method for specifying components of a heterogeneous compound document in a hierarchical tree structure based on a prescribed model by the following steps.

(i) The hierarchical structure of the compound document is identified and the root nodes, internal nodes and leaf nodes are identified.

(ii) A leaf element is created in the model description of the document for each leaf node and describing the leaf node in each of the required formats wherein for each value in the node if input is to be obtained from a new source of data, then a stream start symbol, a stream descriptor, the value and stream end symbol are added to the list of values corresponding to the given format in the leaf element and otherwise, a constant value specified by the leaf node is added to the list of values corresponding to the format in the leaf element.

(iii) An internal node element is created in the model of the document for each identified internal node and describing the internal node in each of the required formats for each child node of the node wherein (a) if the input for the child node is to be obtained from a new source of data, a stream start symbol and a stream descriptor are added to the list of values corresponding to the given format in the internal node element; (b) if the child node is a leaf node, a reference to the corresponding leaf element is added and a stream end symbol is also added if stream start symbol was added in step (a), to the list of values corresponding to the given format; (c) if the child node is an internal node, a reference to the corresponding internal node element is added and a stream end symbol is added if stream start symbol is added in step (a) to the list of values corresponding to the given format.

(iv) A root element is created in the model of the document for each identified root node and describing the root node in each required formats for each child node of the root node wherein (a) if the input for the child node is to be obtained from a new source of data, a stream start symbol and a stream descriptor are added to the list of values corresponding to the given format in the root element; b) if the child node is a leaf node, a reference is added to the corresponding leaf element and a stream end symbol is added to the list of values corresponding to the given format in the root element, if a stream start symbol is added in step (a); (c) if the child node is an internal node, a reference to the corresponding internal node element of the model is added and a stream end symbol is added to the list of values corresponding to the given format of the root element, if a stream start symbol is added in step (a).

Figure 3:
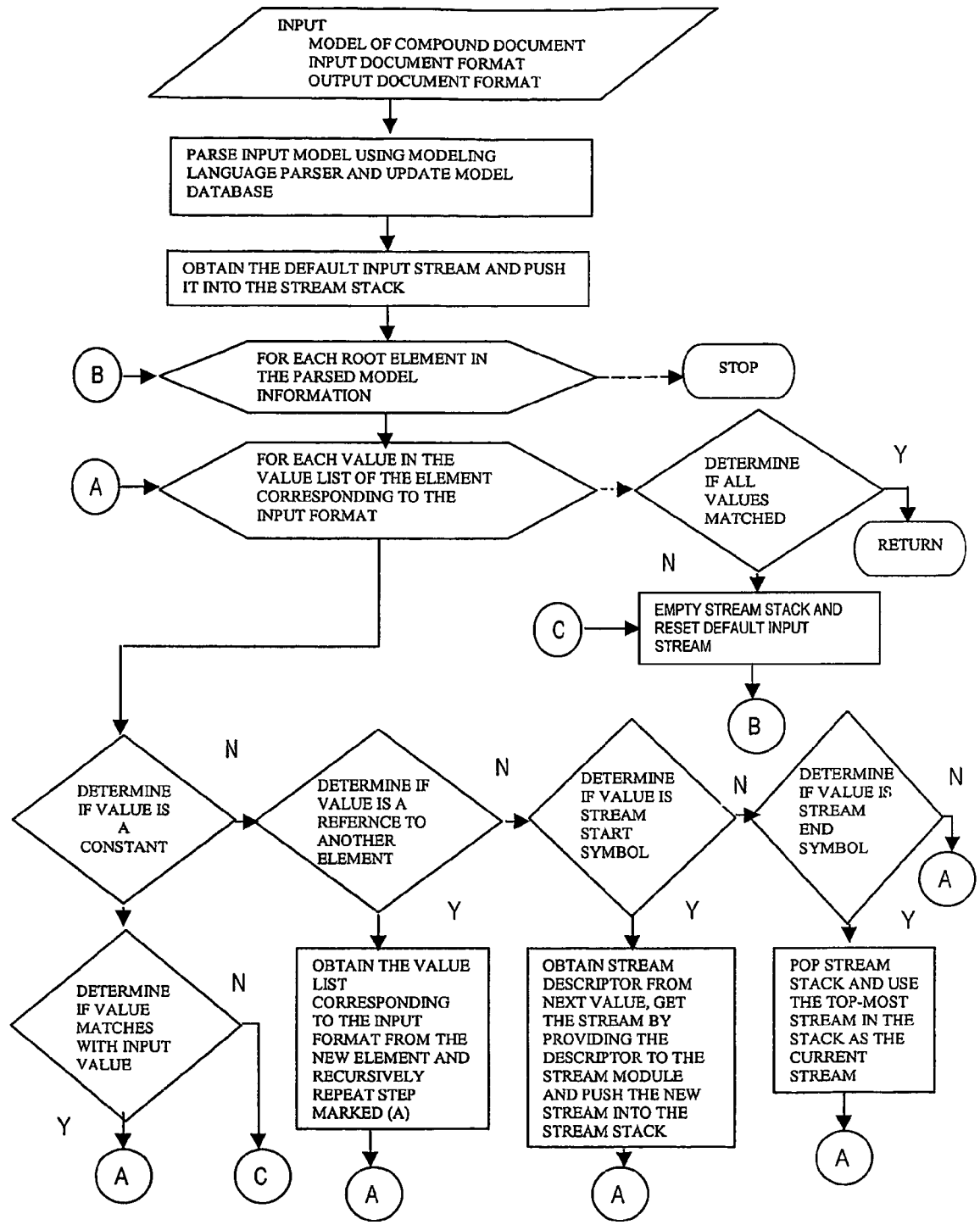
FIG. 3 shows a method for verifying and composing a compound document based on a prescribed model.

FIG. 3 shows the flow chart corresponding to the method of verifying and composing a heterogeneous compound document based on a prescribed model by the following steps.

(i) Provide as inputs a model of the compound document and document format identifier.

(ii) Parse the input model using modeling language parser and update model database with parsed model information.
(iii) Obtain a default input stream for implementation of the method and push the same into the stream stack.
(iv) Consider each root element in the parsed model information and obtain its value list corresponding to the input document format specified by the input document format identifier.
(v) From the value list obtained in the previous step the following steps are carried out as follows:
  a) for a value which is a constant value and matches with the input value obtained from the stream on top of the stream stack, repeat step (v) with the next value;
  b) for a value which is a reference to an internal node element or a leaf element, obtain the value list corresponding to the internal node element or leaf element from model database and recursively repeating step (v) with a new list;
  c) for a value which is a stream start symbol obtain the next value which will be the stream descriptor and providing the stream descriptor to the stream module to obtain a new stream and push it into the stream stack;
  d) for a value which is a stream end symbol, pop all the streams from the stream stack and use the current top most stream on the stream stack for further processing.
(vi) Pop all the streams from the stream stack except for the default input stream, resetting the default input stream and repeating step (iv) onwards with the next root element in the model till all values in the value list match with the input.

Figure 4:
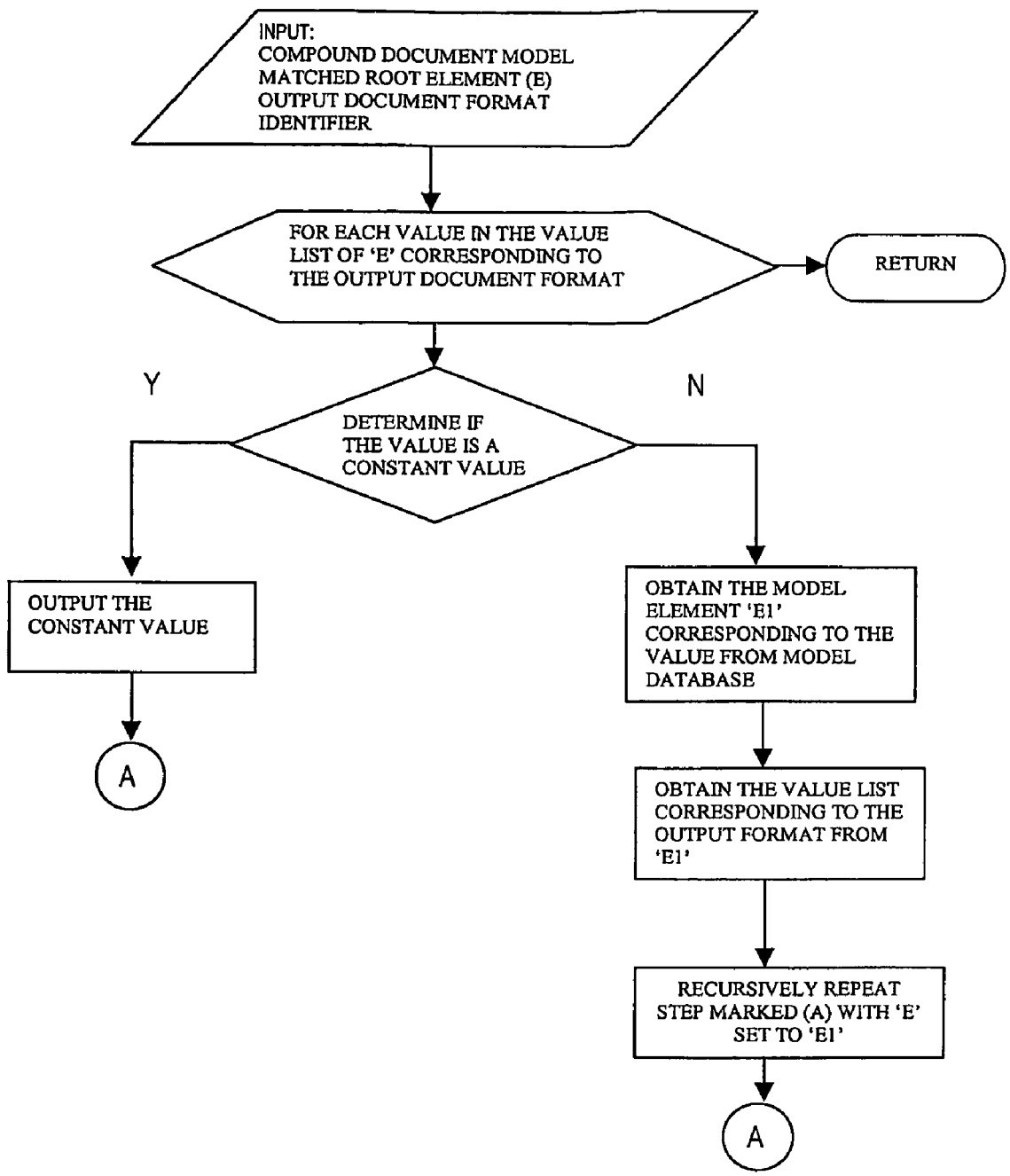
FIG. 4 shows the method for transforming compound document to the required format based on a prescribed model.

FIG. 4 shows the flow chart corresponding to the method for transforming of a heterogeneous compound document based on a prescribed model by the following steps.
(i) A model of the compound document, the root element of the model matching with the input and output document format identifier are provided as inputs.
(ii) A value list corresponding to the output document format identifier is obtained from the root element;
(iii) Considering each value from the value list obtained and
  (a) output the value if the value obtained is a constant,
  (b) obtain the value list corresponding to the output document format identifier form the internal element or leaf element if the value is a reference to an internal node element or leaf element and recursively repeat step (iii) for the new value list.

An example of implementing the method according to the invention is described below.

Consider a Purchase Order document that is available in the eXtensible Markup Language (XML) format. Suppose for some purposes it is required to convert this document into an equivalent text format containing only the data and not the markup tags. The input XML format and the required output text format of the Purchase Order are as specified below:

| XML Input: |
|---|
| <PO><br><SERIAL> 1 </SERIAL><br><DESCRIPTION> item1 </DESCRIPTION><br><UNITPRICE> 2 </UNITPRICE><br><QUANTITY> 4 </QUANTITY><br><ROWTOTAL> 8 </ROWTOTAL><br><SERIAL> 2 </SERIAL><br><DESCRIPTION> item2 </DESCRIPTION><br><UNITPRICE> 2 </UNITPRICE><br><QUANTITY> 4 </QUANTITY> |

| XML Input: |
|---|
| <ROWTOTAL> 8 </ROWTOTAL><br><SERIAL> 3 </SERIAL><br><DESCRIPTION> item3 </DESCRIPTION><br><UNITPRICE> 2 </UNITPRICE><br><QUANTITY> 4 </QUANTITY><br><ROWTOTAL> 8 </ROWTOTAL><br><TOTAL> 24 </TOTAL><br></PO> |

Text Output:
POSTART 1 Item 1 2 4 8 2 item 2 2 4 8 3 item 3 2 4 8 Total 24 POEND As shown above, the input Purchase Order contains serial number, product description, unit price, quantity and row total for each item as well as the grand total price for all the items in XML format. The text version of the same includes all this information except that the XML tags are removed.

Let the input Purchase Order information be stored in a database system. To access the information, the database needs to be accessed and the information read from it.

The model of such a document can be written according to the present invention as follows:

```
---------- START ----------
STMLModel PO {
    STMLLeaf POHeader {
        input = { "<PO>" };
        output= { "POSTART" };
    };
    STMLLeaf POFooter {
        input = { "</PO>" };
        output = { "POEND" };
    };
    STMLLeaf SNO {
        STMLAny sno;
        input = { "<SERIAL>", sno, "</SERIAL>" };
        output = { sno };
    };
    STMLLeaf DES {
        STMLAny des;
        input = { "<DESCRIPTION>", des, "</DESCRIPTION>" };
        output = { des };
    };
    STMLLeaf UP {
        STMLAny up;
        icode = { "<UNITPRICE>", up, "</UNITPRICE>" };
        asm = { up } ;
    };
    STMLLeaf QTY {
        STMLAny qty;
        icode = { "<QUANTITY>", qty, "</QUANTITY>" };
        asm = { qty };
    };
    STMLLeaf RT {
        STMLAny rt;
        input = { "<ROWTOTAL>", rt, "</ROWTOTAL>" };
        output = { rt };
    };
    STMLLeaf PORow {
        SNO sno;
        DES des;
        UP up;
        QTY q;
        RT rt;
        input = { sno, des, up, q, rt };
        output = { sno, des, up, q, rt };
    };
    STMLLeaf POTotal {
        STMLAny GrandTotal;
        input = { "<TOTAL>", GrandTotal, "</TOTAL>" };
        output = { "Total", GrandTotal };
```

-continued

```
    };
    STMLLeaf PORowseq : sequence (PORow);
    STMLLeaf POBody {
        POHeader h;
        PORowseq r;
        POTotal t;
        POFooter f;
        input = { h, r, t, f };
        output = { h, r, t, f };
    };
    STMLLeaf POData {
        POBody body;
        input = { stream "db:DSN=PO;UID="guest";PWD="";:
        SELECT
* from po_table" { body } };
        output = { body };
    };
    STMLNode PO {
        POData data;
        input = { data };
        output = { data };
    };
};
---------- END ----------
```

DESCRIPTION

1) Specification:

The STMLModel construct describes a model of a document and specifies a name for it. In this example, the model is named as 'PO'. For each element in the input XML document, a corresponding leaf element (STMLLeaf) is described. The leaf elements POHeader and POFooter describe the start and end tags of the XML document. The SNO leaf element describes the serial number item, the 'UP' leaf element describes the unit price item and so on. It must be noted that each of the elements describe both the XML form of the data and the text form of the data. The XML format is described by the construct named as 'input' in each of the elements and the text format is described by the construct named as 'output'.

The leaf element PORow is defined as an aggregation of all the leaf elements defined earlier—viz., SNO, DES, UP, QTY, and RT. The leaf element PORowSeq defines a sequence of PORow elements using the 'sequence' construct provided by the modeling language. The POBody leaf element describes the entire input document as a collection of POHeader, PORowSeq, POTotal and POFooter.

The leaf element POData defines the source of the input data. As mentioned earlier, the data for the Purchase Order is available in a database. This is specified using the 'stream' construct in the POData element. The stream construct:

stream "db:DSN=PO; UID="guest"; PWD=" ";: SELECT * from po_table" {body} specifies a database stream (db), with the name of the database as 'PO', user name (UID) as "guest" and password (PWD) as empty. The user name and password are required to access the database. Further, it specifies the command (SELECT * from po_table) to be provided to the database for obtaining the Purchase Order information. The information is assumed to be stored in a database table named 'po_table'. The information thus obtained is used to match the 'body' value, which is of type POBody.

Finally, the internal node element PONode is defined as containing a POBody element in its input (i.e. XML) and output (i.e. text) forms.

This model can be provided to the Modeling Language Parser for checking its conformance to the Modeling Language and for creating the internal representation in the Model Database.

2) Verification, Composition and Transformation:

The Document Composer takes the above model and processes it from the top-level node. In this case, it is the node element 'PO'. The Composer checks the 'input' part of the node and finds reference to POData element ('data'). It then processes, the POData element and finds a stream construct in the 'input' specification. The Composer provides the stream specification to the Stream Module, which in turn creates an appropriate stream (database stream, in this case) and provides input data from the database. The Composer uses the data thus obtained for further matching. This data is matched against the POBody element, which in turn causes it to be matched against the POHeader, PORowSeq, POTotal and POFooter elements. This is continued till all the input is matched as per the model. If at any stage a match does not occur, it means that the input is not as per the model and it is rejected.

The Composer constructs an internal representation of the input data as per the specified model during the matching process. This representation will include both the 'input' and 'output' form of the matched document. For transformation, the Composer takes the internal representation and for each element in it outputs the data present in the 'output' part of the element. Thus, the text form of the Purchase Order will be obtained during the transformation phase.

This example uses only two different formats—XML and text. However, the system according to the present invention allows multiple such formats to be specified in the model and allows transformations from any format to any other format specified in the model.

The system and the method according to the present invention are not restricted to specification, verification, composition and transformation of compound documents based on a prescribed model, They can be used to model any hierarchical information in multiple formats, verify if a given input is according to the syntax specified in the model, compose the output information from multiple input sources specified in the model, and to translate/transform input information to any of the formats specified in the model.

The invention claimed is:

1. A method for transforming a heterogeneous compound document to a desired format based on a prescribed model comprising the steps of:

(i) specifying components of the heterogeneous compound document as a hierarchical tree structure in multiple formats and specifying input sources of information for each of the components as part of said prescribed model;

(ii) verifying and composing the heterogeneous compound document using a modeling language parser and a document composer by dynamically obtaining input information from the input sources of information specified in said prescribed model; and (iii) converting the heterogeneous compound document to the desired format using the document composer, wherein the step of specifying components of heterogeneous compound document as a hierarchical tree structure is carried out by:

(i) identifying hierarchical structure of the heterogeneous compound document and determining the root nodes, internal nodes and leaf nodes;

(ii) creating a leaf element in model description of the heterogeneous compound document for each leaf node and describing each of the leaf node in each of the required formats, with the proviso that for each value in the node, a stream start symbol, a stream descriptor, the value and a stream end symbol are added to list of values corresponding to the given format in the leaf element, if input is to be obtained from a new source of data, otherwise a constant value which is specified by the leaf node is added to the list of values corresponding to the given format in the leaf element;

(iii) creating an internal node element in the model description of the heterogeneous compound document for each identified internal node and describing each of the internal node in each of the required formats for each child node of the node with the proviso that:
  (a) if the input for the child node is to be obtained from a new source of data, a stream start symbol and a stream descriptor are added to the list of values corresponding to the given format in the internal node element;
  (b) if the child node is leaf node, the corresponding leaf element is added to the list of values corresponding to the given format and a stream end symbol is also added, if a stream start symbol was added in step (a);
  (c) if the child node is an internal node, a reference to the corresponding internal node element is added to the list of values corresponding to the given format and a stream end symbol is also added, provided a stream start symbol was added in step (a);

(iv) creating a root element in the model description of the heterogeneous compound document for each identified root node and describing a each of the root node in each of the required formats for each child node of node with the proviso that:
  (a) if the input to the child node is to be obtained from a new source of data, a stream start symbol and a stream descriptor are added to the list of values corresponding to the given format in the root element,
  (b) if the child node is a leaf node, a reference to the corresponding leaf element is added to the list of values corresponding to the given format in the root element, and a stream end symbol is also added if a stream start symbol was added in step (a),
  (c) if the child node is an internal node, a reference to the corresponding internal node element of the model is added to the list of values corresponding to the given format of the root element, and a stream end symbol is also added if a stream start symbol was added in step (a).

2. A method for transforming a heterogeneous compound document to a desired format based on prescribed model comprising the steps of:
  (i) specifying components of the heterogeneous compound document as a hierarchical tree structure in multiple formats and specifying input sources of information for each of the components as part of said prescribed model;
  (ii) verifying and composing the heterogeneous compound document using a modeling language parser and a document composer by dynamically obtaining input information from the input sources of information specified in said prescribed model; and
  (iii) converting the heterogeneous compound document to the desired format using the document composer,
wherein the step of verifying and composing the heterogeneous compound document is carried out by:
(i) providing a model of the heterogeneous compound document and a document format identifier as inputs;
(ii) parsing the input model using a modeling language parser and updating a model database with the parsed model information;
(iii) obtaining a default input stream for the implementation of the method and pushing the same into a stream stack;
(iv) considering each root element in the parsed model information and obtaining a value list corresponding to the input document format specified by the input document format identifier from the root element;
(v) performing the following steps on the value list obtained in the previous step:
  a) repeating step (v) with next value for a constant value which matches with the input values obtained from the stream on top of the stream stack;
  b) obtaining a value list corresponding to the internal node element or leaf element from the model database and recursively repeating step (v) with a new list for a value which is a reference to an internal node element or a leaf element;
  c) obtaining the next value which will be the stream descriptor for a value which is a stream start symbol and providing the stream descriptor to the stream module to obtain a new stream and pushing it into the stream stack;
  d) popping the top most stream from the stream stack and using the current top most stream for further processing for a value which is a stream end symbol;
(vi) popping all the streams from the stream stack except for the default input stream, resetting the default input stream and repeating step (iv) onwards with the next root element in the model, till all values in the value list match with the input and the root element contains the heterogeneous compound document information.

* * * * *